UNITED STATES PATENT OFFICE.

ALEXANDER S. RAMAGE, OF NEWARK, NEW JERSEY, ASSIGNOR TO CHEMICAL DEVELOPMENT CO., OF BUFFALO, NEW YORK, A CORPORATION OF COLORADO.

PROCESS FOR THE SEPARATION OF COMBINED MINERALS.

949,002.      Specification of Letters Patent.      Patented Feb. 15, 1910.

No Drawing.      Application filed July 2, 1909. Serial No. 505,614.

*To all whom it may concern:*

Be it known that I, ALEXANDER S. RAMAGE, a citizen of the United States, residing at Newark, in the county Essex and State of New Jersey, have invented certain new and useful Improvements in Processes for the Separation of Combined Minerals, of which the following is a specification.

This process has for its object the separation of the valuable minerals from such ores as chalcopyrite, $CuFeS_2$, bornite or erubescite, $Cu_3FeS_3$, and mixtures of the same with pyrites, in which ores the copper is in chemical combination with the iron; and also from such ores containing zinc blende. The method is also applicable to compound ores such as those of the cobalt district and other sulfarsenids.

The principle on which the process is founded is the combination of fractional roasting with chemical floating.

In order that the invention may be fully understood, I will describe the same with reference to specific examples. Thus, in the case of an ore containing iron pyrites and chalcopyrite, with a content of about five per cent. of copper and from thirty to forty per cent. of sulfur, the ore is roasted at about a red heat in a furnace capable of utilizing the exothermic reaction between the ingredients of the ore.

The roasting is conducted at a temperature sufficient to decompose only the iron sulfid, and leave the copper in the form of copper sulfid. The burnt ore is then crushed to at least fifteen mesh and passed through a solution of acid sulfate of soda and free nitric acid, (the solution being formed by adding nitric acid to sulfate of soda), which solution is kept near the boiling point. The copper sulfid immediately rises to the top of the bath and can be floated off. Any copper oxid which may have been formed in the roasting operation, at once dissolves and can be recovered from the solution by any of the well known ways.

Where the ore contains, besides iron pyrites and chalcopyrite, zinc blende in quantity, the ore is roasted at a temperature of not over 600° C., with the result that the iron sulfid only is decomposed. The roasted ore is then subjected to the acid sulfate of soda solution in the manner before described, the solution being kept at nearly the boiling point, when the unchanged sulfids of zinc and copper rise to the top of the bath and are floated off, thus being together separated from the iron oxid. The copper and zinc sulfids are then roasted at about 700° C., until all the zinc sulfid is decomposed, the burnt mixture, after cooling, being treated with dilute sulfuric acid, whereby the zinc is completely dissolved, and the copper sulfid is left unchanged. The zinc may then be recovered from the solution by electrolysis in any preferred manner.

The copper sulfids obtained by either of the processes above referred to may then be treated in any of the well known ways to obtain metallic copper.

In the case of the ores of the cobalt district, Dominion of Canada, which are principally cobaltite, nicolite, and mixtures of chalcopyrite and pyrites containing silver in the metallic state and also as sulfid and sulfarsenid, these minerals are "floated" from the gangue, the metallic silver remaining with it and from which it is mechanically separated. The sulfids and sulfarsenids of cobalt, nickel, iron and copper are then roasted at about 800° C., the roasted ore is "floated" as above, and the copper sulfid floated off. The iron, nickel and cobalt are reduced together as an alloy, electrolytically.

I claim:

1. The process of treating mixed sulfid ores, which consists in roasting the mixture at a temperature sufficient to decompose one of the sulfids only, and then subjecting the burnt mixture to chemical flotation, thereby removing the remaining sulfid.

2. The process of treating mixed sulfid ores, which consists in roasting the mixture at a temperature sufficient to decompose one of the sulfids only, and then subjecting the burnt mixture to a solution of acid sulfate of soda and nitric acid, thereby removing the remaining sulfid.

3. The process of treating mixed sulfid ores containing copper and iron, which consists in roasting the mixture at a temperature sufficient to decompose the sulfid of iron, then subjecting the burnt mixture to chemical flotation, thereby removing the copper sulfid.

4. The process of treating mixed sulfid ores containing copper and iron, which consists in roasting the mixture at a temperature sufficient to decompose the sulfid of iron, then subjecting the burnt mixture to a solution of acid sulfate of soda and nitric acid, and floating off the copper sulfid.

5. The process of treating mixed sulfid ores containing sulfids of copper, iron and zinc, which consists in roasting the mixture at a temperature sufficient to decompose the iron sulfid, then subjecting the burnt mixture to chemical flotation, thereby removing the zinc and copper sulfids, roasting the mixed zinc and copper sulfids to decompose the zinc sulfid only, and then dissolving and recovering the zinc.

In testimony whereof, I affix my signature in presence of two witnesses.

ALEXANDER S. RAMAGE.

Witnesses:
J. H. BRICKENSTEIN,
C. W. FOWLER.